Sept. 4, 1951 J. LECARME 2,566,526
AIRCRAFT CONTROL SYSTEM
Filed April 19, 1946 2 Sheets-Sheet 1

INVENTOR.
Jacques Lecarme
BY
Hazeltine Lake & Co.,
AGENTS.

Sept. 4, 1951 J. LECARME 2,566,526
AIRCRAFT CONTROL SYSTEM
Filed April 19, 1946 2 Sheets-Sheet 2
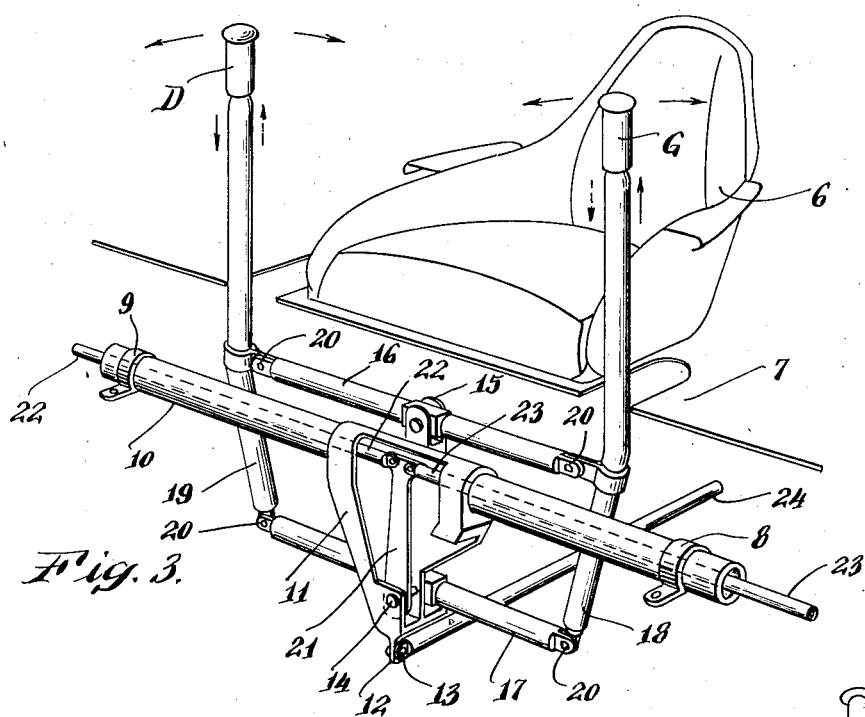
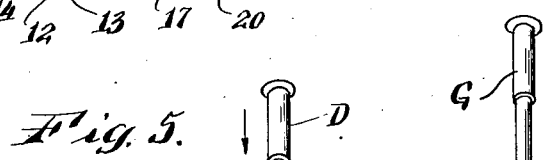
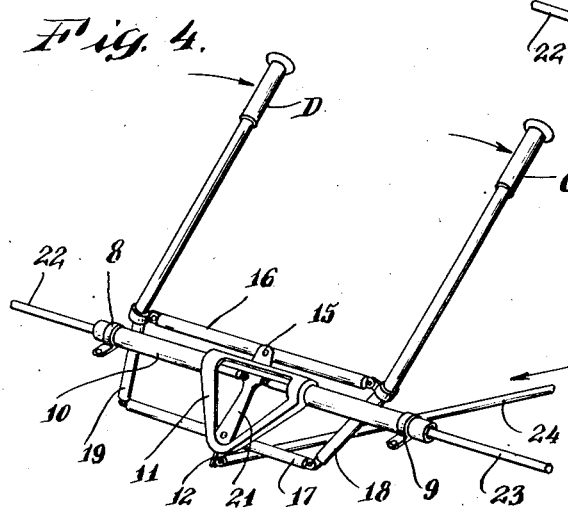
INVENTOR.
Jacques Lecarme
BY
AGENTS Patented Sept. 4, 1951

2,566,526

UNITED STATES PATENT OFFICE 2,566,526

AIRCRAFT CONTROL SYSTEM

Jacques Lecarme, Paris, France, assignor to Société Nationale De Constructions Aeronautiques du Sud-Est, Paris, France, a corporation of France Application April 19, 1946, Serial No. 663,457
In France September 18, 1944

Section 1, Public Law 690, August 8, 1946
Patent expires September 18, 1964

2 Claims. (Cl. 244—83)

In the early days of flying, for controlling the evolutions of aircraft which, at that time, were only of light weight, the pilot used a very simple device which was called the "joy stick;" this was composed of a large lever which was pivoted at one end, generally on spindles, the other end being free and forming a gripping handle which was held by the pilot. To operate the elevator, the pilot pushed or pulled the stick, and to operate the ailerons he moved the handle towards the right or towards the left.

The principle of this device is still in use. However, as the machines subsequently became heavier and heavier, this led to gearing down the elevator and aileron controls by using a wheel with a substantially horizontal shaft mounted on the end of a pivoted lever and which was moved, like the joy stick, in the horizontal direction to operate the elevator and by turning the wheel to operate the ailerons.

In present day machines, and more particularly those of great weight, this wheel device leads to cumbersome constructions which pass, in general, between the pilot's legs, inconvenience him and prevent him from having forward and downward visibility in his machine. These facts constitute disadvantages in the piloting of aircraft, aeroplanes, seaplanes or any other flying machines.

These disadvantages, which are well known to users, are now eliminated by the subject of the present invention which comprises constructional devices which are believed to be novel and which utilize more particularly two control sticks that can be coupled together in different ways and the operation of which enables the pilot to retain the use of his reflexes while decreasing his muscular strain and providing a maximum clearance of the space which is in front of him, thereby simultaneously improving his comfort, his visibility and facilitating the control of the instruments placed on his instrument panel. These main advantages provide novel results which characterize this invention.

According to the invention, two control sticks, one placed on the right and the other on the left of the pilot, are adapted to be moved forward or backward together to operate the elevator control as in the case of the joy stick, and to be moved upward or downward to operate the aileron control, said control sticks having a movement in opposite directions to each other like the wheel which in turning had an upwardly moving side and a downwardly moving side. The combination of these movements is effected by means of mechanisms which can be housed at will either under the floor or on the ceiling of the aircraft. This is a novel and important advantage for the installation of certain aircraft.

Such a control device further possesses the following advantages:

1. Owing to the fact that there are two control sticks to take the same strain as when there is only one, a simpler and less cumbersome construction is obtained.
2. The spacing apart of the two control sticks corresponds to the well-known advantage of having a wheel of very large diameter to decrease the muscular strain imposed on the pilot, without having the disadvantage of its large size and of the visual obstruction which it created in front of him.

Some of these flight control devices are shown in the accompanying drawings which are given to explain their operation and which can be used, as non-limitative examples, for their construction.

According to these drawings:

Fig. 3 shows, in the neutral position, a first embodiment of the device, the two control sticks being connected together by two bars, the whole arrangement forming an articulated parallelogram, the aileron control moving substantially in the axis of the connecting tube of the elevator control.

Fig. 4 shows, on a smaller scale, the same device as that shown in Fig. 3, with the elevator control in the position for maximum elevation.

Fig. 5 again shows this same device with the aileron control in one of its extreme positions.

Figure 1:
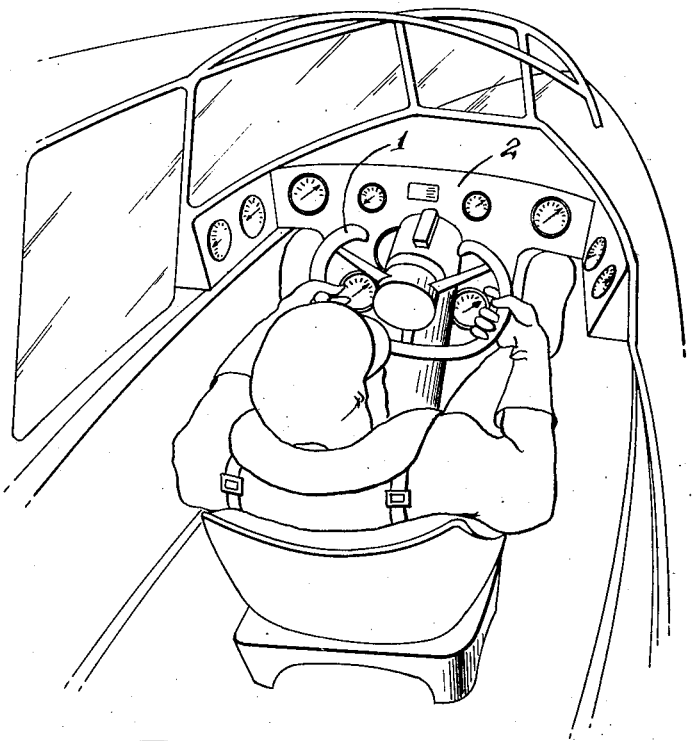
Fig. 1 shows a perspective view of a pilot using an old flying control device with a wheel.
Figure 2:
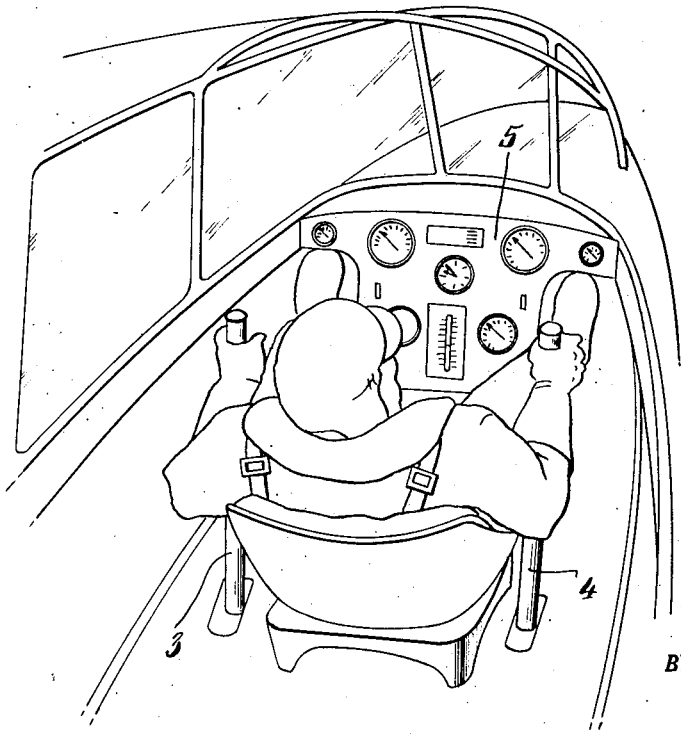
Fig. 2 shows, in the same conditions of illustration as Fig. 1, this pilot using the double control sticks which are the subject of the present invention and showing, in particular, the improved visibility.

Considering Fig. 1, a cockpit is shown equipped with a central control stick having a wheel 1 of an old type, a large portion of the vertical instrument panel 2 is hidden, whereas if Fig. 2 is now considered, a cockpit is shown equipped with a double control stick device 3 and 4, the instrument panel 5 is completely visible and has been lowered, thereby increasing the outer visibility of the pilot at the same time as his view of the navigational instruments.

In order properly to ascertain the present invention, the various embodiments described are shown lodged under the floor or on the ceiling of the aircraft, according to requirements. The same mechanisms can, conversely, be installed on the ceiling or under the floor.

Figs. 3, 4 and 5 relate to the description of an embodiment of the double control stick flying control seen from the front left hand side of the machine. The pilot's seat 6 and the floor 7 can be seen. The device is fixed to the aircraft by means of bearings 8 and 9 in which can rotate the transverse tube 10 whose axis always remains perpendicular to the longitudinal axis of the aircraft. A housing 11 which is secured to the tube 10 rotates with it. The lower end of said housing is provided with a connection 12, the pivot 13 of which is parallel to that of the tube 10. The housing 11 carries two other articulations formed by the pivots 14 and 15, the pivotal axes of which are perpendicular to that of the tube 10 and on which the bars 16 and 17 rock about their centre. The ends of these two bars support, by means of pivots 20 which are parallel to those forming the articulations 14 and 15, the lower portion 18 of the left hand control stick G and the lower portion 19 of the right hand control stick D. By construction the pivots 20 form the apices of a parallelogram which as it becomes deformed produces parallel movements of the two control sticks G and D relatively to each other owing to the articulations 14 and 15. The lower bar 17 is operatively connected to the lever 21 so that they pivot together on the pivot 14. The upper end of the lever 21 carries the connections of the aileron control rods 22 and 23 which pass through and move in the central portion of the tube 10.

This device operates as follows: The pilot can hold both of the control sticks or only one of them. It is assumed that the aircraft is in normal flight and that the controls are in their mean position which corresponds to the illustration of Fig. 3. The two control sticks are vertical and the handles are at the same height.

To operate the elevator control the pilot holding the control sticks by the handles D and G moves them away from or towards his shoulders; Fig. 4 shows the device in a position with the handles pulled towards him. The two sticks have become inclined, causing the whole device to rotate about the axis of the tube 10 by means of the fixed bearings 8 and 9 through the bars 16 and 17 reacting on the housing 11.

The joint 12 has moved in the opposite direction to the handles, carrying with it the elevator control through the rod 24.

To operate the aileron control, the pilot raises or lowers the handles G or D. The device being in the mean position of Fig. 3, he lowers for example D and raises G; the device takes up the position shown in Fig. 5.

The tube 10 and the housing 11 have not moved, the parallelogram ABCD has been deformed, the bars 16 and 17 which are pivoted on the housing 11 have become inclined in a plane parallel to the transverse tube 10; similarly the lever 21 which is pivoted on the pivot 14 and is secured to the bar 17 has rotated in the plane of the tube 10, carrying with it the aileron control rods 22 and 23. The operative connection between the bar 17 and the lever 21 can be rigid, geared up or geared down according to requirements, by means of known devices.

What I claim is:

1. A flying control device for aircraft or the like, comprising two substantially vertical control sticks located on either side of the pilot's seat, two horizontal cross bars extending in the transverse plane of the aircraft and pivotally connected to said control sticks with which they form an articulated parallelogram, a transverse tube adapted to rotate in bearings secured to the framework of the aircraft, aileron control rods axially movable in said tube, a frame member connected to said tube, said cross bars being pivotally connected at their centre portion to said frame member, an elevator control rod pivotally connected to the lower part of said member, said member carrying integral with one of the cross bars, a lever operatively connected to said aileron control rods, whereby the elevator control is actuated when said control sticks are moved forward or backward in unison and the aileron control is actuated when said sticks are moved upward or downward in opposite directions.

2. A flying control device for aircraft or the like comprising two substantially vertical control sticks located on either side of the pilot's seat, two substantially horizontal cross bars pivotally connected to said control sticks and forming therewith a parallelogram in a plane normal to the longitudinal plane of the aircraft, a frame connecting the central portions of the two cross bars, a central lever rigidly connected to the lower cross bar and pivotally connected to said frame, a transverse tube attached to the framework of the aircraft and to said frame, two aileron control rods axially movable in said tube, said rods being pivoted to said lever, and an elevator control rod pivotally connected to the lower part of said frame, whereby the movement of said control sticks backward or forward in unison will actuate the elevator control rod and the movement of said sticks upward or downward in opposite direction will actuate the aileron control rods, said control sticks being adapted to actuate the elevator control rod and aileron control rods independently and simultaneously by combined movements.

J. LECARME.

REFERENCES CITED

The following references are of record in the file of this patent:

UNITED STATES PATENTS

| Number | Name | Date |
|---|---|---|
| 1,184,890 | Stevens | May 30, 1916 |
| 1,432,213 | Sorensen | Oct. 17, 1922 |
| 2,345,120 | Haseloff et al. | Mar. 28, 1944 |

FOREIGN PATENTS

| Number | Country | Date |
|---|---|---|
| 25,726 | Great Britain | of 1909 |